(12) United States Patent
Arnold

(10) Patent No.: US 9,707,828 B2
(45) Date of Patent: Jul. 18, 2017

(54) VEHICLE VISOR COVER

(71) Applicant: Duane Arnold, Texas City, TX (US)

(72) Inventor: Duane Arnold, Texas City, TX (US)

( * ) Notice: Subject to any disclaimer, the term of this patent is extended or adjusted under 35 U.S.C. 154(b) by 0 days.

(21) Appl. No.: 14/581,734

(22) Filed: Dec. 23, 2014

(65) Prior Publication Data

US 2016/0176268 A1  Jun. 23, 2016

(51) Int. Cl.
*B60J 3/02* (2006.01)

(52) U.S. Cl.
CPC .................. *B60J 3/0204* (2013.01)

(58) Field of Classification Search
CPC .............................. B60J 3/0204; B60J 3/0208
USPC ...................... 296/97.1, 97.5, 1.07
See application file for complete search history.

(56) References Cited

U.S. PATENT DOCUMENTS

| 2,517,337 | A | * | 8/1950 | Nodle | B60R 7/05 |
| | | | | | 224/312 |
| 2,589,348 | A | * | 3/1952 | Diefenbach | B60R 7/05 |
| | | | | | 224/312 |
| 2,707,072 | A | * | 4/1955 | Sims | B60R 7/05 |
| | | | | | 224/312 |
| 2,931,114 | A | | 4/1960 | Peterson | |
| 3,809,428 | A | | 5/1974 | Cohen | |
| 4,781,409 | A | | 11/1988 | Harbison | |
| 4,944,971 | A | | 7/1990 | McLaughlin | |
| D309,756 | S | | 8/1990 | Lothridge | |
| 5,772,272 | A | * | 6/1998 | Faddis | B60J 3/0213 |
| | | | | | 224/274 |
| D432,490 | S | | 10/2000 | Golenz | |
| D436,916 | S | | 1/2001 | Eskandry | |
| 6,276,081 | B1 | | 8/2001 | Shedd | |
| 6,659,529 | B2 | | 12/2003 | Palmer et al. | |
| 7,044,531 | B2 | | 5/2006 | Schaad | |
| 7,216,918 | B1 | * | 5/2007 | Runfola | B60J 3/0204 |
| | | | | | 296/97.11 |
| 7,686,373 | B1 | | 3/2010 | McCabe et al. | |
| 7,818,907 | B1 | * | 10/2010 | Warrington, Jr. | B60J 3/0204 |
| | | | | | 296/97.6 |
| 8,561,865 | B2 | | 10/2013 | Mantis | |
| 2002/0074838 | A1 | | 6/2002 | Whiting et al. | |

* cited by examiner

*Primary Examiner* — Jason S Morrow
*Assistant Examiner* — E Turner Hicks
(74) *Attorney, Agent, or Firm* — Royston Rayzor Vickery & Williams L.L.P.; William P. Glenn, Jr.

(57) ABSTRACT

A vehicle visor cover including a cover with removable strapping with sufficient dimensions to span one side of a vehicle visor and at least one strap configured to releaseably attach to the upper and lower periphery of the cover.

3 Claims, 5 Drawing Sheets

VEHICLE VISOR COVER

CROSS-REFERENCES TO RELATED APPLICATIONS

NOT APPLICABLE

STATEMENT REGARDING FEDERALLY SPONSORED RESEARCH OR DEVELOPMENT

NOT APPLICABLE

NAMES OF PARTIES TO A JOINT RESEARCH AGREEMENT

NOT APPLICABLE

REFERENCE TO A SEQUENCE LISTING

NOT APPLICABLE

BACKGROUND OF INVENTION (1) Field of Invention

The present invention relates generally to visors of vehicles. More particularly, the present invention relates to covers for vehicle visors.

(2) Background of Invention

There exist a number of vehicle visor covers that disclose covers for visor installed in/or a vehicle, such as a car, truck or vessel. Typically, the cover is fixed to the visor by making the cover a sleeve or having fixed strapping. Either attachment means must be tailored for the specific visor shape. This in turn requires visor covers to be customized to fit the wide variety of vehicle visors that are on the market.

The present invention has been developed to alleviate the drawback set forth above and provide further benefits to the user. These enhancements and benefits are described in greater detail herein below with respect to several alternative embodiments of the present invention.

BRIEF SUMMARY OF THE INVENTION

The present invention in its several disclosed embodiments alleviate the drawbacks and deficiencies described above with respect to conventional vehicle visor covers. The present invention incorporates several additionally beneficial features.

The present invention is directed to a cover that can be installed on a wide variety of vehicle visors. Another beneficial feature of the present invention is the use of removable straps or covers that can be replaced when worn or faded.

It is the general object of the present vehicle visor cover invention to provide a cover for use on vehicle visors.

BRIEF DESCRIPTION OF THE SEVERAL VIEWS OF THE DRAWINGS

The invention is described in greater details in the following examples and with reference to the attached drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and a representative basis for teaching one skilled in the art to variously employ in the present invention.

Figure 1:
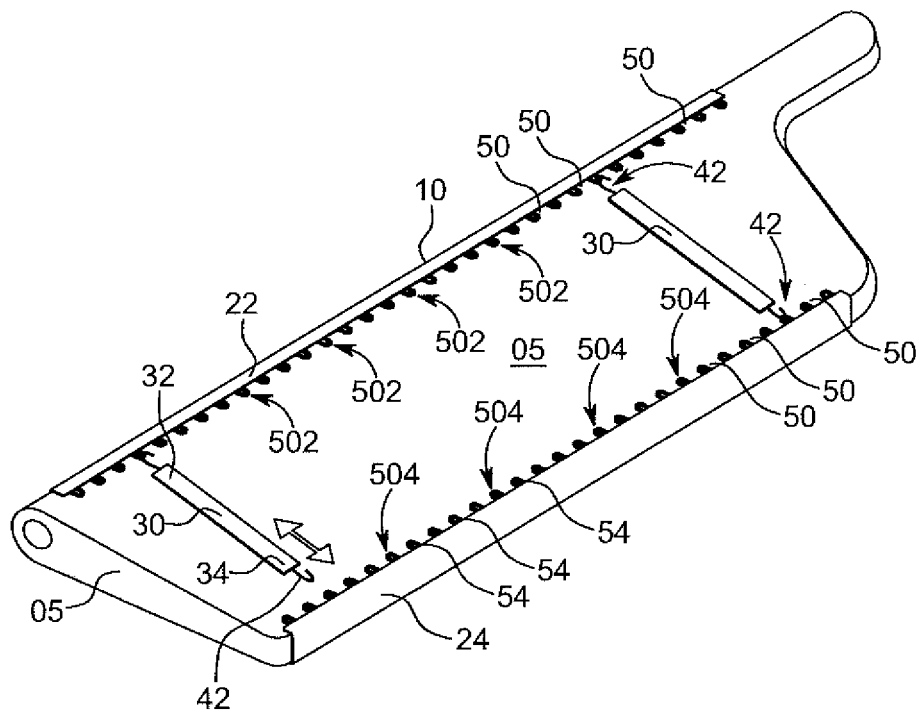
FIG. 1 is an isometric view of an embodiment of a vehicle visor cover depicting straps, strap couplers as hooks and cover couplers as loops.
Figure 1A:
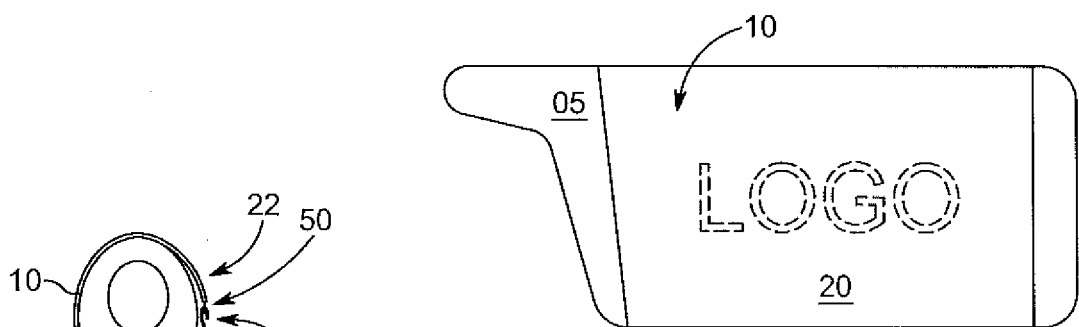
FIG. 1a is a plan view of an embodiment of a vehicle visor cover depicting the cover.
Figure 2:
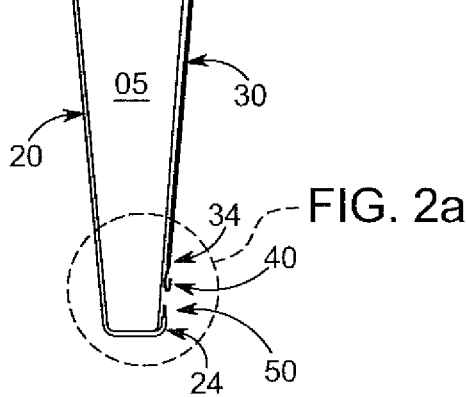
FIG. 2 is a plan view of an embodiment of a vehicle visor cover depicting the vehicle visor, cover, straps, strap coupler and cover coupler.

The present invention is directed toward a vehicle visor cover 10 that can be easily secured or removed from a vehicle visor 05 with little effort or time by a user. A cover 20 is removeably fixed to a vehicle visor 05 by at least one strap 30 releaseably coupled at each end to the upper periphery 22 and lower periphery 24 of the cover 20. See FIGS. 1 and 3-6. In a preferred embodiment, cover 20 is of sufficient dimensions to span at least a portion of one side of the vehicle visor 05 and position the upper periphery 22 and lower periphery 24 of the cover 20 on the opposite side of the vehicle visor 05. See FIG. 2. In yet another embodiment, the length of cover 20 can be equal to or less than the length of vehicle visor 05. See FIG. 1a. It is contemplated that cover 20 can be flexible or stiff so long as the upper periphery 22 and lower periphery 24 are in facing opposition of each other on the vehicle visor side that is opposite to the side adjacent to the cover 20. See FIG. 2. It is further contemplated that cover 20 can be positioned on either side of the vehicle visor depending upon the user's needs. When positioned on the visor 05 side which faces away from the vehicle, words, graphics, lights, decorations, CD holder, accessory holder or a combination thereof can be displayed on cover 20 for others to see. See FIG. 1a. It is further contemplated that visor 20 can be manufactured from plastic, cloth, lightweight metal, composite material or a combination thereof, so long as the upper periphery 22 and lower periphery 24 are in facing opposition of each other on the vehicle visor side opposite to the side adjacent to the cover 20. See FIG. 2. In a preferred embodiment, visor 20 is manufactured from material(s) resistant to deterioration from sunlight.

At least one strap 30 is connected between the upper periphery 22 and lower periphery 24 to securely hold cover 20 against the vehicle visor 05. See FIGS. 1-6. In a preferred embodiment, two or more straps 30 are releaseably coupled to the upper periphery 22 and lower periphery 24 by strap couplers 40 and cover couplers 50. See FIGS. 1 and 3. In another preferred embodiment, at least one strap 30 with multiple strap couplers 40 is connected between the upper periphery 22 and lower periphery 24 to securely hold cover 20 against the vehicle visor 05. See FIGS. 4 and 5. The strap 30 is of sufficient length that, when stretched, connects to upper periphery 22 and lower periphery 24, resulting in cover 20 being held tightly and securely against the vehicle visor 05. See FIG. 2. It is contemplated that strap 30 can have a cross section that is square, rectangular, arcuate or a combination thereof. It is further contemplated that strap 30 is manufactured from an elastic material such as, but not limited to: rubber, elastic banding, SPANDEX, elastomers and/or a combination thereof. In a preferred embodiment, strap 30 is manufactured from material(s) resistant to deterioration from sunlight.

The strap couplers 40 fixed to the upper end region 32 and lower end region 34 of strap 30 can be hooks 42, loops 44 or a combination thereof. See FIGS. 1 and 3-5. Similarly, the cover couplers 50 fixed to the upper periphery 22 and lower periphery 24 of cover 20 can be hooks 52, loops 54 or a combination thereof. See FIGS. 1 and 3-5. It is contemplated that hooks and loops can be manufactured from any durable material that is resistant to sunlight deterioration and deformation from a corresponding coupler.

In a preferred embodiment, strap couplers 40 are hooks 42 at both the upper end region 32 and lower end region 34 of strap 30 and the upper cover coupler 502 and lower cover coupler 504 are a plurality of loops 44, 54. See FIG. 1. In yet another embodiment, strap couplers 40 are loops 44 at both the upper end region 32 and lower end region 34 of strap 30 and the upper cover coupler 502 and lower cover coupler 504 are a plurality of hooks 42, 52. See FIG. 3.

In another embodiment, strap couplers 40 on the upper end region 32 are loops 44, the strap couplers 40 on the lower end region 34 are hooks 42, the upper cover couplers 502 are a plurality of hooks 52 and the lower cover couplers 504 are a plurality of loops 54. In yet another embodiment, strap couplers 40 on the upper end region 32 are hooks 42, the strap couplers 40 on the lower end region 34 are loops 44, the upper cover couplers 502 are a plurality of loops 54 and the lower cover couplers 504 are a plurality of hooks 52. See FIG. 4. In either of these two preferred embodiments, fixation of strap 30 can only be done in one orientation which can be useful in proper orientation of the cover 20—especially when text, graphics or lighting are displayed on cover 20.

In yet another embodiment, upper cover coupler 502 and lower cover coupler 504 are slideably fixed to their corresponding upper or lower periphery 22, 24. See FIG. 6. Slideable fixation of either an upper cover coupler 502 or a lower cover coupler 504 is achieved by fixing a rail 56 to the corresponding periphery 22 or 24. See FIG. 6. At least two cars 58 are slideably fixed to the upper rail 562. See FIG. 6. At least two cars 58 are slideably fixed to the lower rail 564. See FIG. 6. A cover coupler 50 as described above is connected to each car 58 thereby allowing the user to orient strap 30 as desired.

Figure 2A:
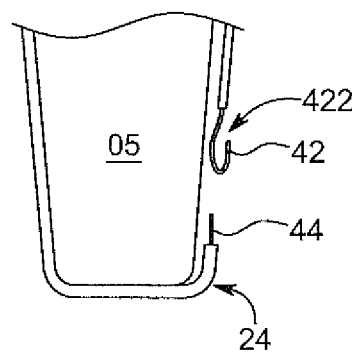
FIG. 2a is a detailed view of an embodiment of a vehicle visor cover depicting the vehicle visor, cover, straps, strap coupler and cover coupler.
Figure 3:
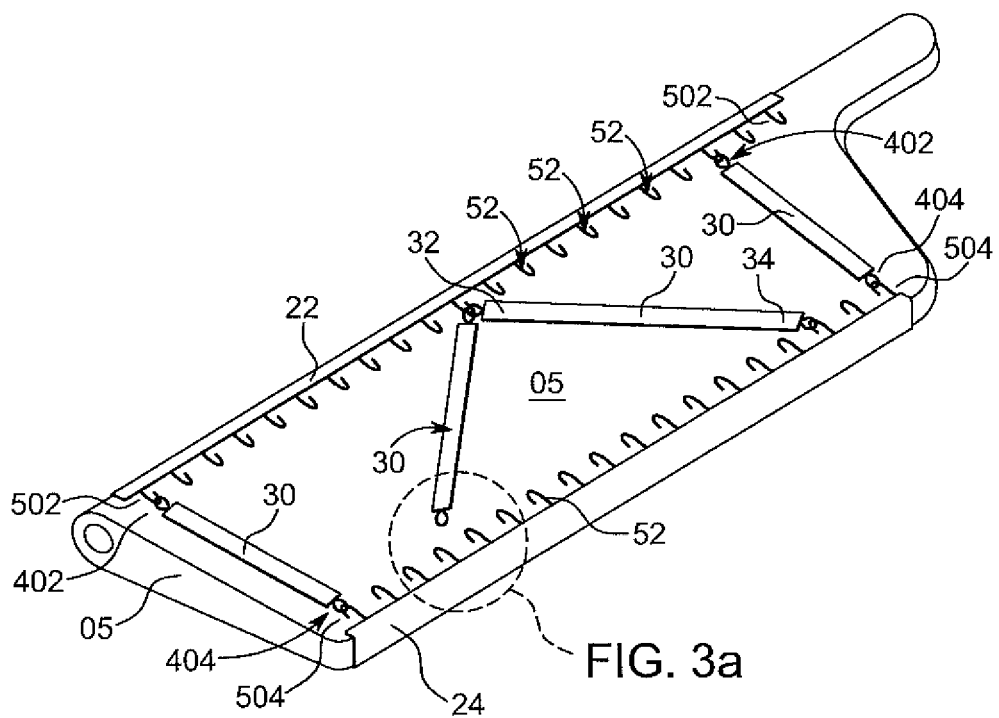
FIG. 3 is an isometric view of an embodiment of a vehicle visor cover depicting upper and lower cover couplers as hooks with opposing gaps, and strap couplers as loops.
Figure 3A:
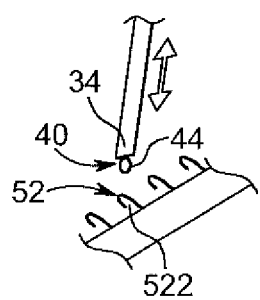
FIG. 3a is a detailed view of an embodiment of a vehicle visor cover depicting the strap, strap coupler and cover coupler.
Figure 4:
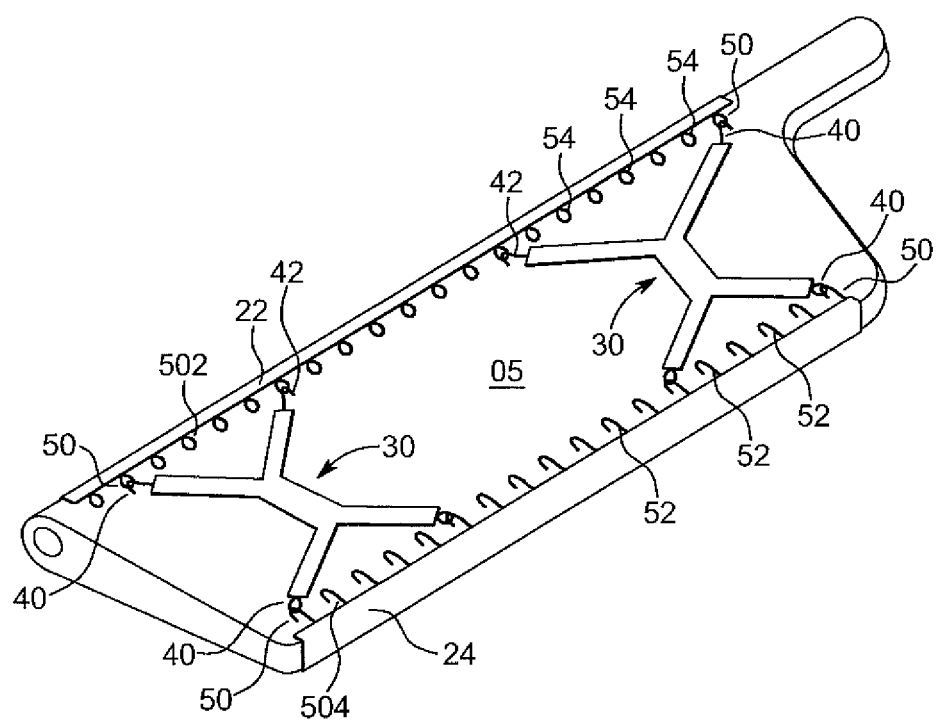
FIG. 4 is an isometric view of an embodiment of a vehicle visor cover depicting an upper cover coupler as loops, a lower cover coupler as hooks, and a strap with multiple strap couplers as hooks and loops.
Figure 5:
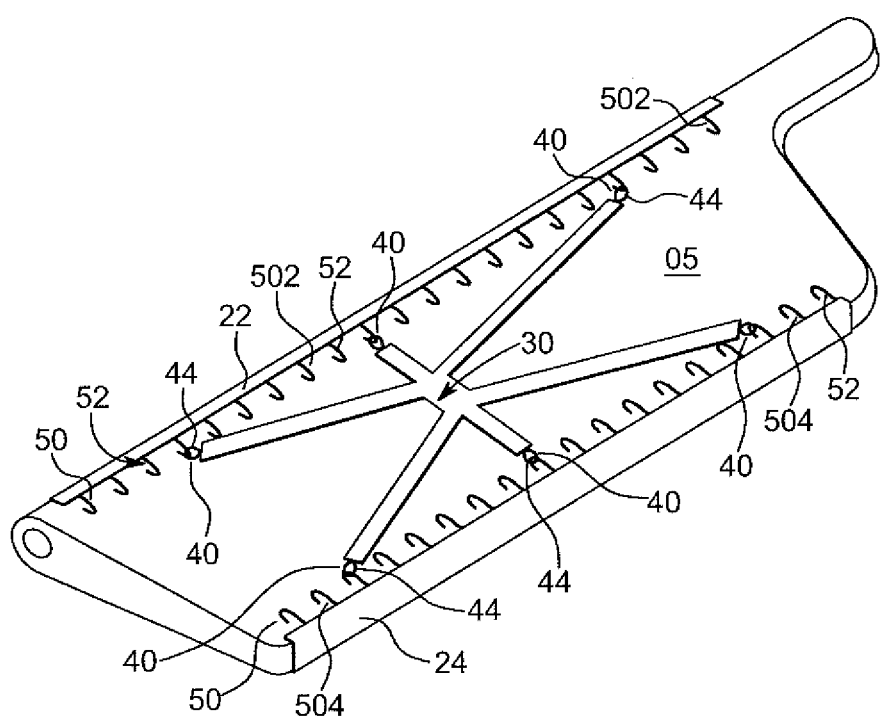
FIG. 5 is an isometric view of an embodiment of a vehicle visor cover depicting upper and lower cover couplers as hooks, and a strap with multiple strap couplers as loops.
Figure 6:
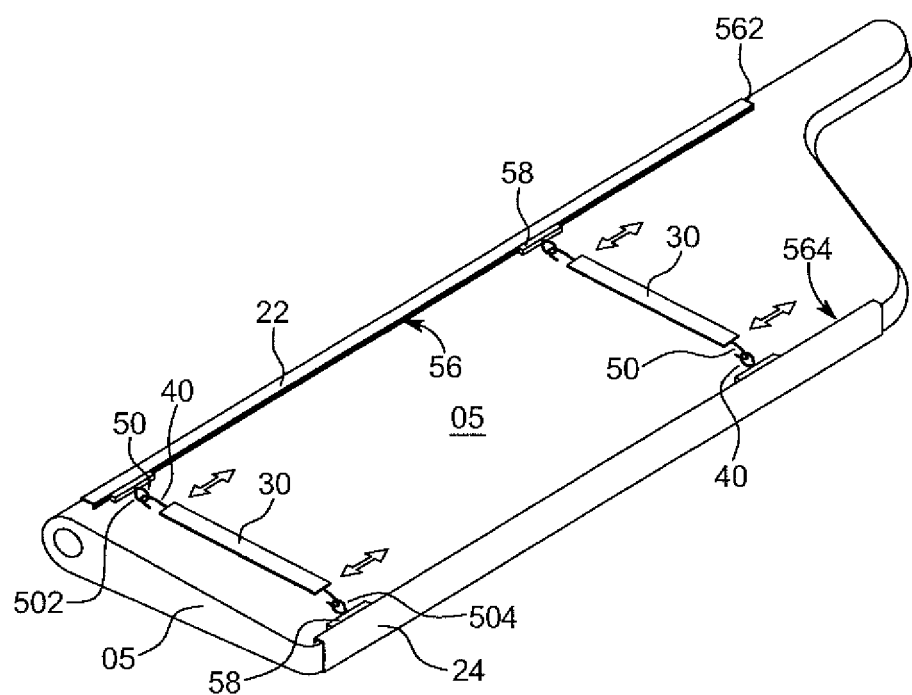
FIG. 6 is an isometric view of an embodiment of a vehicle visor cover depicting slideably fixed upper and lower cover couplers as loops and straps with strap couplers as hooks.

In those embodiments where the cover couplers 50 are loops 44, the preferred embodiment is to orient the loops 44 generally parallel to the surface of the vehicle visor 05. See FIGS. 1, 2 and 4. In those embodiments where the cover couplers 50 are hooks 42, the preferred embodiment is to orient the hooks 42 with the hook gaps 422 away from the surface of the vehicle visor 05. See FIG. 2a. In those embodiments where the cover couplers 50 are hooks 42, another embodiment is to orient the hooks 42 generally parallel to the surface of the vehicle visor 05. See FIG. 5. In those embodiments where the cover couplers 50 are hooks 42, yet another embodiment is to orient the hook gaps 422 of the upper periphery opposite to the hook gaps 422 of the lower periphery. See FIG. 3. In such an orientation, the unintentional release of a strap 30 is at least reduced. In those embodiments where the strap couplers 40 are loops 44, the preferred embodiment orients the loops 44 generally parallel to the surface of vehicle visor 05. See FIGS. 1 and 4. Yet, it is contemplated that loops 44 can be orientated generally perpendicular to the surface of vehicle visor 05.

A vehicle visor cover 10 and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

The invention claimed is:

1. A cover for a vehicle visor comprising:
   a cover with an upper periphery and lower periphery, wherein dimensions of said cover are sufficient to span one side of a vehicle visor and position said upper periphery and lower periphery in facing opposition of each other on said vehicle visor;
   a rail fixed to each of said peripheries;
   at least one car adjustably, slideably positionable on each of said rails;
   a cover coupler mounted to a corresponding said car;
   at least one strap further comprising at least one upper end region and at least one lower end region;
   a strap coupler mounted to each of said upper end regions and said lower end regions of said straps, wherein said strap and cover couplers releaseably fix said at least one strap to said cover to securely hold said cover against the vehicle visor.

2. A cover for a vehicle visor comprising:
   a cover with an upper periphery and lower periphery, wherein dimensions of said cover are sufficient to cover one side of a the vehicle visor and position said upper periphery and said lower periphery in facing opposition of each other on said vehicle visor forming a gap between said upper and lower peripheries;
   a first plurality of cover couplers fixed to said upper periphery;
   a second plurality of cover couplers fixed to said lower periphery, wherein at least two of said cover couplers are slideably positionable on said cover;
   at least one strap in contact with said vehicle visor between said upper and lower peripheries and spanning said gap having at least one upper end region and at least one lower end region, each of said end regions fixed to a corresponding strap coupler, wherein each of said strap couplers is releaseably fixed to a corresponding said cover coupler to securely hold said vehicle cover against said the vehicle visor.

3. A cover for a vehicle visor comprising;
a cover with an upper periphery and lower periphery, wherein dimensions of said cover are sufficient to span one side of a vehicle visor and position said upper periphery and lower periphery in facing opposition of each other on said visor;
at least two straps, each strap further comprising an upper strap coupler releaseably coupled to a corresponding upper cover coupler fixed to said upper periphery and a lower strap coupler releaseably coupled to a corresponding lower cover coupler fixed to said lower periphery, wherein said couplers releaseably fix said straps to said cover to securely hold said cover against the vehicle visor; and
wherein at least two of said cover couplers are slideably positionable on said cover.

* * * * *